United States Patent
Ogawa

(10) Patent No.: US 9,157,831 B2
(45) Date of Patent: Oct. 13, 2015

(54) NUMERICAL CONTROL DEVICE HAVING FUNCTION OF ESTIMATING EXPIRATION OF LIFE OF BEARING SUPPORTING SPINDLE

(71) Applicant: FANUC Corporation, Minamitsuru-gun, Yamanashi (JP)

(72) Inventor: Hajime Ogawa, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 0 days.

(21) Appl. No.: 14/276,115

(22) Filed: May 13, 2014

(65) Prior Publication Data
US 2014/0338468 A1  Nov. 20, 2014

(30) Foreign Application Priority Data
May 16, 2013 (JP) .................... 2013-104090

(51) Int. Cl.
*G01D 7/00* (2006.01)
*G01M 13/04* (2006.01)
*B23Q 17/09* (2006.01)
*G05B 19/4065* (2006.01)

(52) U.S. Cl.
CPC ........ *G01M 13/04* (2013.01); *B23Q 17/0957* (2013.01); *B23C 2260/80* (2013.01); *G05B 19/4065* (2013.01)

(58) Field of Classification Search
CPC ............ Y10T 408/165; G05B 19/4065; B23C 2260/08; B23Q 17/0957; G01M 13/04
USPC ................ 73/862.041, 862.321, 862.322
See application file for complete search history.

(56) References Cited

U.S. PATENT DOCUMENTS

| | | | | | |
|---|---|---|---|---|---|
| 4,386,407 | A | * | 5/1983 | Hungerford | ............... 700/188 |
| 4,617,635 | A | * | 10/1986 | Shimizu | .................. 700/170 |
| 5,404,308 | A | * | 4/1995 | Kajiyama | .................. 700/188 |
| 6,266,572 | B1 | * | 7/2001 | Yamazaki et al. | ............. 700/96 |
| 2002/0013639 | A1 | | 1/2002 | Fujishima et al. | |
| 2003/0167100 | A1 | * | 9/2003 | Fujita et al. | .................. 700/175 |
| 2004/0193307 | A1 | | 9/2004 | Fujishima et al. | |
| 2012/0109539 | A1 | | 5/2012 | Hasegawa et al. | |

FOREIGN PATENT DOCUMENTS

| | | |
|---|---|---|
| JP | H05-208343 A | 8/1993 |
| JP | H07-51993 A | 2/1995 |
| JP | H07-195256 A | 8/1995 |
| JP | H09-272044 A | 10/1997 |
| JP | 2001-350510 A | 12/2001 |
| JP | 2004-295348 A | 10/2004 |
| JP | 2011-247660 A | 12/2011 |
| JP | 2012-092910 A | 5/2012 |
| JP | 2014-092398 A | 5/2014 |

* cited by examiner

*Primary Examiner* — Max Noori
(74) *Attorney, Agent, or Firm* — Drinker Biddle & Reath LLP

(57) ABSTRACT

A numerical control device determines whether or not a spindle is in a cutting state where it machines a workpiece. If the spindle is in a cutting state, the numerical control device calculates a second rotational speed, which is obtained by multiplying a rotational speed of the spindle by a weight corresponding to a force on the spindle calculated based on a torque of a feed shaft, and integrates the calculated value into an index value. If the spindle is not in the cutting state, the numerical control device integrates the rotational speed of the spindle into the index value. The lifetime of a bearing is estimated based on the index value.

7 Claims, 3 Drawing Sheets

NUMERICAL CONTROL DEVICE HAVING FUNCTION OF ESTIMATING EXPIRATION OF LIFE OF BEARING SUPPORTING SPINDLE

RELATED APPLICATION DATA

This application claims priority under 35 U.S.C. §119 and/or §365 to Japanese Application No. 2013-104090 filed May 16, 2013, the entire contents is incorporated herein by reference.

BACKGROUND OF THE INVENTION

1. Field of the Invention

The present invention relates to a numerical control device with a function of estimating the lifetime of a bearing supporting a spindle of a machine tool.

2. Description of the Related Art

A bearing that supports the spindle of a machine tool is gradually degraded by friction or load, so that it should be replaced with a new one at an appropriate time. Conventionally, a total number of revolutions and total rotation time of the spindle, which are obtained by integrating the rotational speed and rotation time of the spindle, are used as criteria for the time to replace the spindle bearing of the machine tool. For example, a numerical control device with a lifetime management function is disclosed in Japanese Patent JP5-208343A. This numerical control device determines the lifetime of a movable part by comparing a cumulative value of relevant operational quantities and a preset life value of the movable part, and comprises display means for displaying the cumulative value. Further, a bearing life monitoring method is disclosed in Japanese Patent JP2011-247660A. According to this monitoring method, the life value of a bearing is obtained by individually calculating average values of the rotation numbers of a rotor supported by the bearings and loads on the rotor, based on the operating conditions of a machine. The maintenance timing is displayed as a message when the lifetime is exceeded by an integrated value of a rotation time of the rotor.

The life of the bearing that supports the spindle of the machine tool is affected by a force that acts on the spindle. The spindle and a workpiece are not in contact with each other when the workpiece is not being cut. When the workpiece is being cut, however, the spindle contacts the workpiece, so that a force equivalent to a reaction force from the workpiece acts on the spindle. In the cutting mode, therefore, a load on the bearing is greater than in the non-cutting mode, so that the life of the bearing becomes shorter.

Conventionally, however, the rotational speed and rotation time of the spindle are simply integrated irrespective of the mode, cutting or non-cutting, so that the influence of the load on the spindle is ignored. According to the lifetime management technique disclosed in Japanese Patent JP5-208343A, for example, the operational quantities of the spindle are simply integrated without consideration of the influence of the force on the movable part. If the predetermined cumulative value is reached, therefore, the movable part is inevitably determined to require replacement without regard to the magnitude of the force thereon.

SUMMARY OF THE INVENTION

Accordingly, the object of the present invention is to provide a numerical control device having a function of estimating the lifetime of a bearing that supports a spindle and configured to monitor a cutting signal indicative of a cutting state, integrate the rotational speed and rotation time of the spindle in a conventional method when not in cutting operation, and perform integration by multiplying the rotational speed and rotation time by a weight corresponding to a force acting on the spindle during the cutting operation, so that the time to replace the bearing can be more accurately estimated by acquiring an integrated value in consideration of the influence of the force acting on the spindle during the cutting operation.

A numerical control device according to the present invention has a function of estimating the lifetime of a bearing which supports a spindle of a machine tool and is configured to control the machine tool. The numerical control device comprises a physical quantity acquisition unit configured to acquire, for each predetermined period, a rotational speed of the spindle and a torque of a feed shaft from a control unit for controlling drive shafts or detectors mounted on the drive shafts, a cutting signal monitoring unit configured to monitor a cutting signal output from the control unit and indicative of a cutting state, a load calculation unit configured to calculate a force acting on the spindle based on the torque of the spindle acquired by the physical quantity acquisition unit, a weight extraction unit configured to extract a weight corresponding to the force on the spindle calculated by the load calculation unit from a previously given table, an integration unit configured to integrate the rotational speed of the spindle for each predetermined period if the cutting signal indicates a non-cutting state and to integrate, for each predetermined period, a second rotational speed of the spindle obtained by multiplying the rotational speed of the spindle acquired by the physical quantity acquisition unit by the weight extracted by the weight extraction unit if the cutting signal indicates the cutting state, and a storage unit configured to store an integrated value integrated by the integration unit. The lifetime of the bearing is estimated based on the integrated value obtained by the integration unit.

The numerical control device may comprise a rotation signal monitoring unit, which monitors a rotational state signal indicative of whether the spindle is rotating or stopped, and the integration unit may be configured to integrate the predetermined period if the rotational state signal and the cutting signal indicate the rotation of the spindle and the non-cutting state, respectively, and to integrate, for each predetermined period, a second predetermined period obtained by multiplying the predetermined period by the weight extracted by the weight extraction unit if the rotational state signal and the cutting signal indicate the rotation of the spindle and the cutting state, respectively.

The load calculation unit may be configured to calculate the force acting on the spindle based on a torque obtained by subtracting an acceleration torque, which is obtained by multiplying an acceleration of the feed shaft acquired by the control unit or the detectors by an inertia, from the torque of the feed shaft acquired by the physical quantity acquisition unit.

The load calculation unit may be configured to calculate the force acting on the spindle based on a torque obtained by subtracting a torque component corresponding to friction on the feed shaft from the torque of the feed shaft.

According to the present invention, by employing the configuration described above, there can be provided a numerical control device having a function of estimating the lifetime of a bearing that supports a spindle and configured to monitor a cutting signal indicative of a cutting state, integrate the rotational speed and rotation time of the spindle in a conventional method when not in cutting operation, and perform integration by multiplying the rotational speed and rotation time by a weight corresponding to a force acting on the spindle during the cutting operation, so that the time to replace the bearing can be more accurately estimated by acquiring an integrated value in consideration of the influence of the force acting on the spindle during the cutting operation.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

In one embodiment of a numerical control device according to the present invention, the numerical control device does not obtain a lifetime of a bearing that supports the spindle of a machine tool, but calculates an index value to be compared with the lifetime. It is not that the time duration of rotation of the spindle supported by the bearing is simply integrated into an integrated value, but that the index value is acquired based on an integrated value obtained in consideration of the influence of a force that acts on the spindle. Thus, even if the life value is a previously fixed value, the lifetime of the bearing can be accurately determined based on this consideration. In this specification, symbol M denotes the index value, integrated value, or rotation time.

(Embodiment 1)

Figure 1:
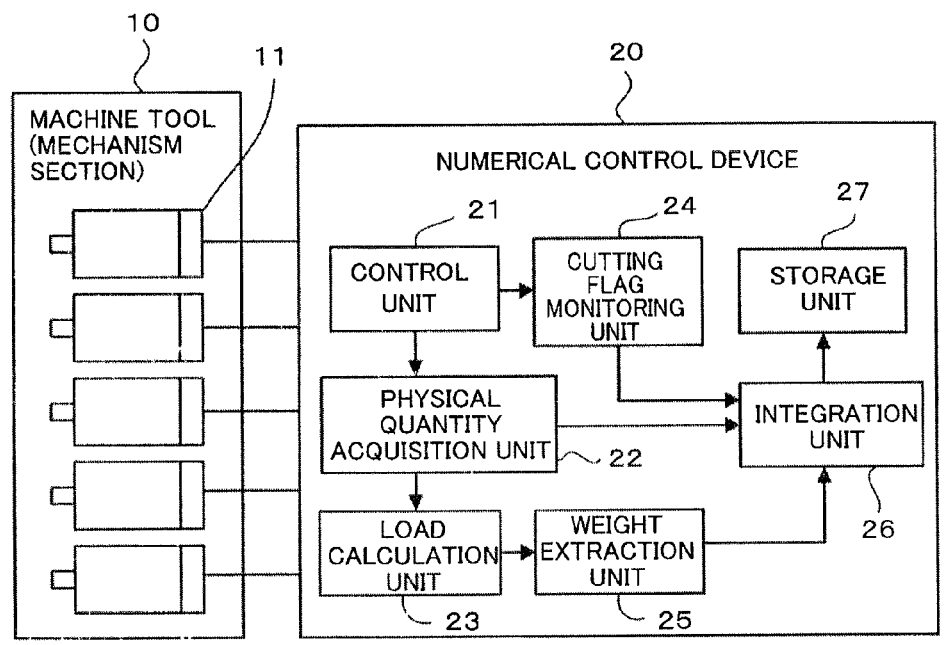
FIG. 1 is a block diagram showing a numerical control device according to the present invention.

FIG. 1 is a block diagram showing a numerical control device 20 according to the present invention. Axes of a machine tool 10 are drivingly controlled by a servomotor 11 in a mechanism section of the machine tool that is controlled by the numerical control device 20.

The life of the bearing that supports the spindle of the machine tool is affected by abrasion, accumulated metal fatigue, etc. Therefore, a cumulative value of the rotational speed or rotation time of the spindle supported by the bearing is an effective index value used to determine the time to replace the bearing. Since the life of the bearing is affected by the force acting on the spindle, however, the index value obtained by simply integrating the rotational speed and rotation time of the spindle is insufficient.

When the spindle supported by the bearing is driven, for example, the life of the bearing varies depending on the magnitude of the force acting on the spindle or current, even for the same total rotation number. If the force on the spindle increases, the force on the bearing also increases, so that the bearing life is inevitably reduced. If the force on the bearing decreases, in contrast, the bearing life is increased.

According to the present embodiment, therefore, a cutting signal indicative of a cutting state is monitored. If the cutting signal indicates the cutting state where the spindle machines a workpiece, the rotational speed and rotation time of the spindle is multiplied by a weight corresponding to the force acting on the spindle and integrated into an integrated value. If the cutting signal indicates a non-cutting state, the rotational speed and rotation time are integrated without being multiplied by the weight. During the cutting operation in which the spindle and the workpiece is in contact with each other, therefore, the index value can be acquired in consideration of the influence of the force acting on the spindle. Thus, the time to replace the bearing can be estimated more accurately than in the case of the simple integration.

Specifically, a physical quantity acquisition unit 22 in a numerical control device 20 acquires a rotational speed $V(k\Delta t)$ of the spindle and a torque $S(k\Delta t)$ ($k=0, 1, 2, 3 \ldots$) of a feed shaft for each predetermined period $\Delta t$ from a control unit 21, which controls individual drive shafts of the machine tool 10, that is, motors, or detectors (not shown) mounted on the drive shafts. A load calculation unit 23 calculates a force $D(k\Delta t)$ acting on the spindle based on the torque $S(k\Delta t)$ of the feed shaft acquired by a physical quantity acquisition unit 22.

Figure 2A:
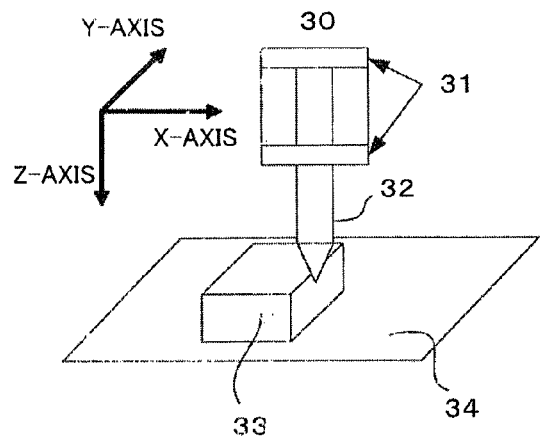
FIGS. 2A and 2B are diagrams illustrating a resultant force acting on a spindle in a machine configuration in which the spindle is moved in a Z-axis direction based on three orthogonal axes, X-, Y-, and Z-axes.
Figure 2B:
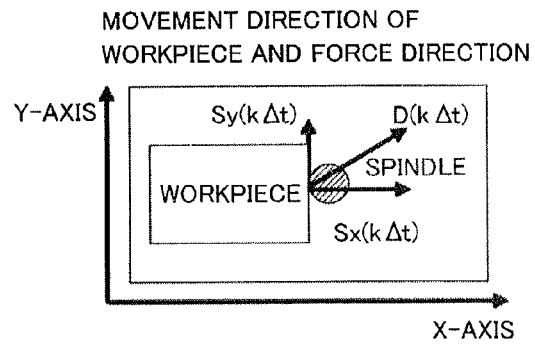

FIGS. 2A and 2B show a machine configuration in which the spindle is moved in the Z-axis direction based on three orthogonal axes, X-, Y-, and Z-axes. A workpiece 33 placed on a table 34 is machined by a tool 32 mounted on a spindle 30. If the position of the Z-axis is fixed and the torques of the X- and Y-axes assumed to be $Sx(k\Delta t)$ and $Sy(k\Delta t)$ respectively, the force acting on the spindle is the resultant force $D(k\Delta t)$ along the X- and Y-axes, as given by equation (1). The resultant force $D(k\Delta t)$, which acts vertically on the spindle, is approximately defined here as a force acting on a bearing 31. The force on the bearing 31 may be obtained based on the configuration of the spindle and the force $D(k\Delta t)$ on the spindle.

$$D(k\Delta t) = \sqrt{Sx(k\Delta t)^2 + Sy(k\Delta t)^2} \qquad (1)$$

Then, a weight extraction unit 25 extracts a weight $E(k\Delta t)$, by which the rotational speed $V(k\Delta t)$ of the spindle is multiplied, from a corresponding table of a previously given force $D_k$ and weight $E(D_k)$, based on the value $D(k\Delta t)$ calculated by the load calculation unit 23. The weight $E(D_k)$ can be obtained from a measured value, simulation result, etc.

Let us assume, for example, that the life achieved when the spindle continues to be driven at a predetermined speed $V_k$ in the non-cutting state where the spindle and the workpiece are not in contact is $L_k$. If the life achieved when the spindle continues to be driven at the predetermined speed $V_k$ in the cutting state where the feed shaft controls the relative positions of the spindle and the workpiece to apply the force $D_k$ to the spindle is $L(D_k)$, the life in the cutting state is $L(D_k)/L_k$ times that in the non-cutting state. Thus, the value $L(D_k)/L_k$ obtained by dividing the life in the cutting state by that in the non-cutting state or the like may be given as the weight $E(D_k)$ by which the rotational speed $V(k\Delta t)$ of the spindle is multiplied.

Then, a cutting flag monitoring unit 24 monitors whether the spindle is in the cutting state or in the non-cutting state, based on a cutting or non-cutting signal or flag obtained from the control unit 21. The cutting signal is generated when the cutting state is determined based on cutting feed codes G01, G03, etc., on an NC program of the machine tool or if a load on the spindle exceeds a predetermined value.

If the spindle is in the cutting state, a weight $E(D(k\Delta t))$ extracted by the weight extraction unit 25 is multiplied by the rotational speed $V(k\Delta t)$ in an integration unit 26, whereby a second rotational speed $V'(k\Delta t)$ is calculated as given by equation (2). Then, the integration unit 26 integrates the absolute value of the product of the second rotational speed V'(kΔt), based on the consideration of the weight, and the predetermined period Δt, thereby calculating an index value M, as given by equation (3). In the non-cutting state, in contrast with the case of the cutting state, no force directly acts on the spindle, so that the index value M is calculated by directly integrating the absolute value of the product of the rotational speed V(kΔt) and the predetermined period Δt, as given by equation (4).

$$V'(k\Delta t) = E(D(k\Delta t)) \times V(k\Delta t), \quad (2)$$

$$M = \sum_{k=0}^{n} |E(D(k\Delta t)) \times V(k\Delta t) \times \Delta t| = \sum_{k=0}^{n} |V'(k\Delta t) \times \Delta t|, \quad (3)$$

$$M = \sum_{k=0}^{n} |V(k\Delta t) \times \Delta t| \quad (4)$$

$$(k = 0, 1, 2, 3 \ldots ).$$

Figure 3A:
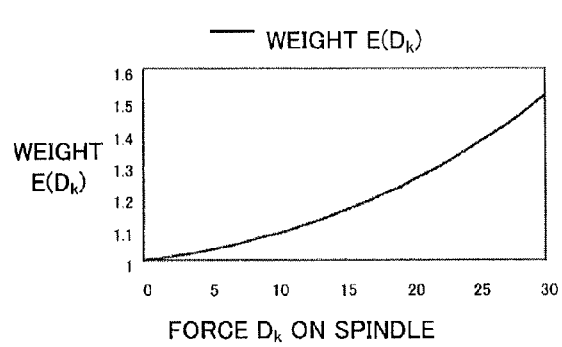
FIGS. 3A, 3B and 3C are diagrams illustrating how an index value to estimate the lifetime of a bearing varies depending on whether or not a weight acting on the spindle is taken into consideration.
Figure 3B:
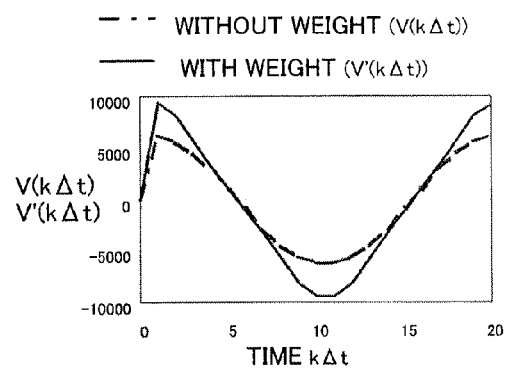
Figure 3C:
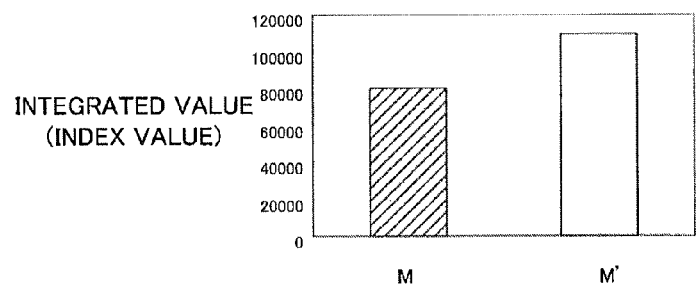

FIG. 3A shows the weight $E(D_k)$ corresponding to the force $D_k$ acting on the spindle. FIG. 3B shows the second rotational speed V'(kΔt) obtained by multiplying the rotational speed V(kΔt) of the spindle by the weight E(D(kΔt)). FIG. 3C shows an integrated value of the second rotational speed V'(kΔt), that is, an index value M'. The integrated value or index value M is a value obtained by simply integrating the rotational speed V(kΔt) of the spindle. Here the predetermined period Δt is set to 1. Thus, it can be seen that the index value M varies depending on whether or not the weight is taken into consideration.

The index value M calculated in this manner is stored in a storage unit 27 and used for maintenance. For example, the index value M is output to an output unit, such as a display device (not shown), and an operator determines whether or not the time to replace the bearing is reached, based on the result of the output. Further, a predetermined criterion for the replacement time and the index value are compared. If the index value is higher than the criterion, a warning is issued to the effect that the time to replace the bearing is near or the machine is stopped. Alternatively, the index value and the criterion for the replacement time are compared as conditions for machine operation are automatically eased when the end of the lifetime of the bearing is approaching or if the bearing is expected to be used for a long time.

(Embodiment 2)

A rotation time M of the spindle, that is, an integrated value of a predetermined period Δt, is calculated in Embodiment 2. Since the rotation time is an example of the integrated value, it is denoted by M that is indicative of the integrated value. A rotation signal monitoring unit (not shown) acquires a rotational state signal (or flag) from a control unit 21 and monitors whether the spindle is rotating or stopped. For example, if an S command, which is a spindle rotation command on an NC program, is not 0, the rotation signal monitoring unit determines that the spindle is rotating. If the S command is 0, the monitoring unit determines the spindle to be stopped.

If the rotational state signal and a cutting signal indicate the rotation of the spindle and a non-cutting state, respectively, the integration unit 26 integrates the predetermined period Δt, thereby calculating the rotation time M, as given by equation (5). If the rotational state signal and the cutting signal indicate the rotation of the spindle and a cutting state, respectively, in contrast, the integration unit 26 integrates a second predetermined period Δt', which is obtained by multiplying the predetermined period Δt by a weight E(D(kΔt)) extracted by a weight extraction unit 25, thereby calculating the rotation time M, as given by equation (6).

$$M = \sum_{k=0}^{n} \Delta t, \quad (5)$$

$$M = \sum_{k=0}^{n} E(D(k\Delta t)) \times \Delta t = \sum_{k=0}^{n} \Delta t' \quad (6)$$

$$(k = 0, 1, 2, 3 \ldots ).$$

Figure 4:
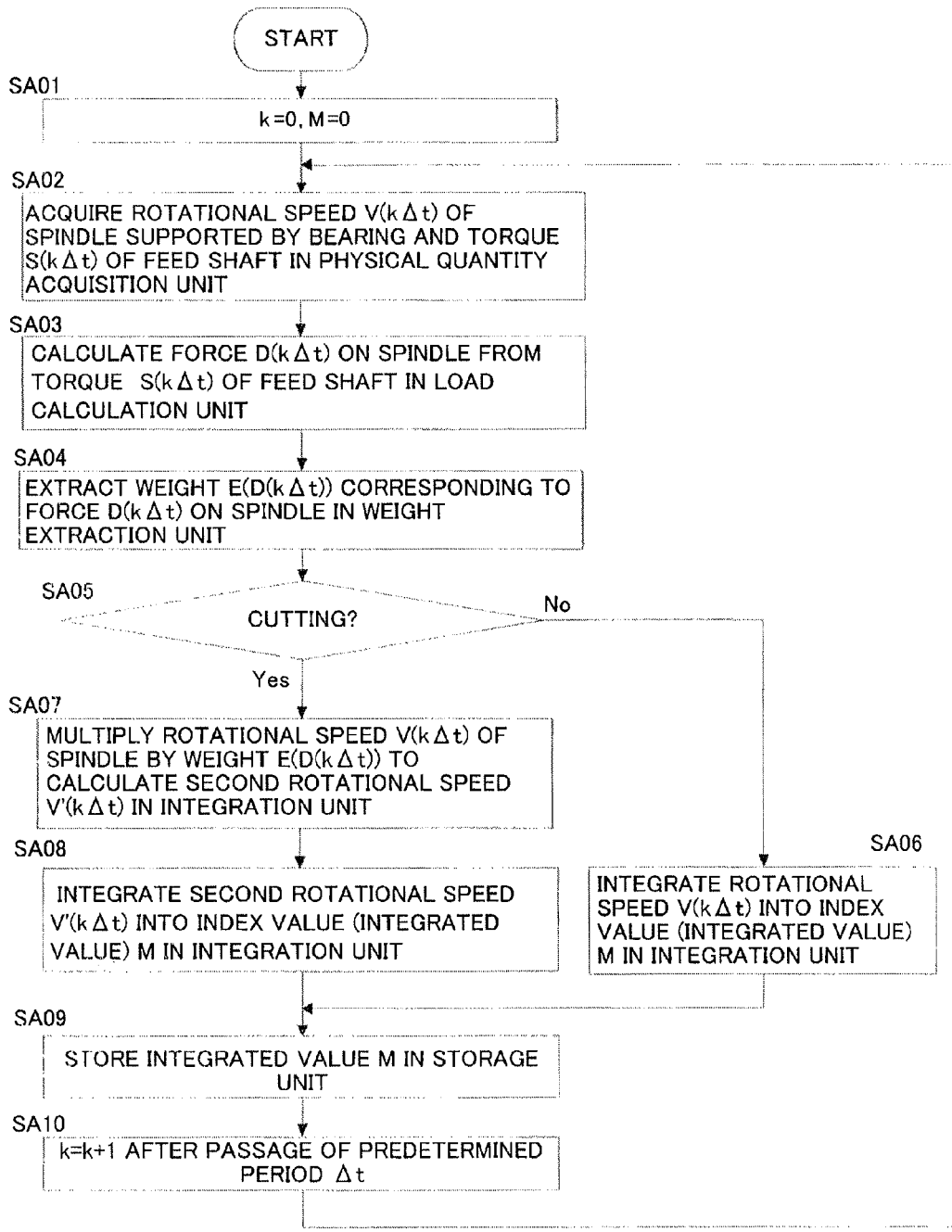
FIG. 4 is a flowchart illustrating processing for calculating the index value for the determination of the lifetime of the bearing.

Processing for obtaining the index value or integrated value M, which is performed in the numerical control device 20 shown in FIG. 1, will now be described with reference to FIG. 4. FIG. 4 is a flowchart illustrating the processing for calculating the index value for the determination of the lifetime of the bearing. The following is a sequential description of each step of operation.

[Step SA01] Values k and M are initialized or set to 0.

[Step SA02] The rotational speed V(kΔt) of the spindle supported by the bearing and the torque S(kΔt) of the feed shaft are acquired.

[Step SA03] The force D(kΔt) acting on the spindle is calculated from the torque S(kΔt) of the feed shaft.

[Step SA04] The weight E(D(kΔt)) corresponding to the force D(kΔt) acting on the spindle is calculated.

[Step SA05] It is determined whether or not cutting is being performed. If the cutting is being performed (YES), the program proceeds to Step SA07. If not (NO), the program proceeds to Step SA06.

[Step SA06] The rotational speed V(kΔt) is integrated into the index value or integrated value M, whereupon the program proceeds to Step SA09.

[Step SA07] The rotational speed V(kΔt) of the spindle is multiplied by the weight E(D(kΔt)), whereby the second rotational speed V'(kΔt) is calculated.

[Step SA08] The second rotational speed V'(kΔt) is integrated into the index value or integrated value M.

[Step SA09] The integrated value M is stored in the storage unit.

[Step SA10] After the passage of the predetermined period Δt, a value obtained by adding 1 to k is newly set as k, whereupon the program returns to Step SA02.

The following is a description of the correspondence between the steps of processing shown in the flowchart and the individual parts of the numerical control device 20. The processing of Step SA02 corresponds to the physical quantity acquisition unit 22; Step SA03 to the load calculation unit 23, Step SA04 to the weight extraction unit 25, Step SA05 to the cutting flag monitoring unit 24, Steps SA06 to SA08 to the integration unit 26, and Step SA09 to the storage unit 27.

(Embodiments 3 and 4)

Since the torque S(kΔt) of the feed shaft includes a torque A(kΔt) associated with the acceleration/deceleration of the feed shaft and a torque F(kΔt) associated with friction, A(kΔt) and F(kΔt) should be subtracted from S(kΔt), as given by equation (7), in order to extract only a torque S'(kΔt) on the spindle.

$$S'(k\Delta t)=S(k\Delta t)-A(k\Delta t)-F(k\Delta t)=S(k\Delta t)-J\times a(k\Delta t)-F(k\Delta t) \quad (7)$$

The acceleration/deceleration torque can be obtained by multiplying an inertia J on a motor that drives the feed shaft by an acceleration a(kΔt) obtained from the control unit or the detectors on the drive shafts. The acceleration a(kΔt) may be obtained by differentiating the position and speed. Further, the friction torque F(kΔt) is calculated from static or dynamic friction produced as the motor is driven.

The invention claimed is:

1. A numerical control device having a function of estimating the lifetime of a bearing which supports a spindle of a machine tool and configured to control the machine tool, the numerical control device comprising:
   a physical quantity acquisition unit configured to acquire, for each predetermined period, a rotational speed of the spindle and a torque of a feed shaft from a control unit for controlling drive shafts or detectors mounted on the drive shafts;
   a cutting signal monitoring unit configured to monitor a cutting signal output from the control unit and indicative of a cutting state;
   a load calculation unit configured to calculate a force acting on the spindle based on the torque of the spindle acquired by the physical quantity acquisition unit;
   a weight extraction unit configured to extract a weight corresponding to the force on the spindle calculated by the load calculation unit from a previously given table;
   an integration unit configured to integrate the rotational speed of the spindle for each predetermined period if the cutting signal indicates a non-cutting state and to integrate, for each predetermined period, a second rotational speed of the spindle obtained by multiplying the rotational speed of the spindle acquired by the physical quantity acquisition unit by the weight extracted by the weight extraction unit if the cutting signal indicates the cutting state; and
   a storage unit configured to store an integrated value integrated by the integration unit,
   the lifetime of the bearing being estimated based on the integrated value obtained by the integration unit.

2. The numerical control device according to claim 1, wherein the numerical control device comprises a rotation signal monitoring unit, which monitors a rotational state signal indicative of whether the spindle is rotating or stopped, and the integration unit integrates the predetermined period if the rotational state signal and the cutting signal indicate the rotation of the spindle and the non-cutting state, respectively, and integrates, for each predetermined period, a second predetermined period obtained by multiplying the predetermined period by the weight extracted by the weight extraction unit if the rotational state signal and the cutting signal indicate the rotation of the spindle and the cutting state, respectively.

3. The numerical control device according to claim 1, wherein the load calculation unit calculates the force acting on the spindle based on a torque obtained by subtracting an acceleration torque, which is obtained by multiplying an acceleration of the feed shaft acquired by the control unit or the detectors by an inertia, from the torque of the feed shaft acquired by the physical quantity acquisition unit.

4. The numerical control device according to claim 1, wherein the load calculation unit calculates the force acting on the spindle based on a torque obtained by subtracting a torque component corresponding to friction on the feed shaft from the torque of the feed shaft.

5. The numerical control device according to claim 2, wherein the load calculation unit calculates the force acting on the spindle based on a torque obtained by subtracting an acceleration torque, which is obtained by multiplying an acceleration of the feed shaft acquired by the control unit or the detectors by an inertia, from the torque of the feed shaft acquired by the physical quantity acquisition unit.

6. The numerical control device according to claim 2, wherein the load calculation unit calculates the force acting on the spindle based on a torque obtained by subtracting a torque component corresponding to friction on the feed shaft from the torque of the feed shaft.

7. The numerical control device according to claim 3, wherein the load calculation unit calculates the force acting on the spindle based on a torque obtained by subtracting a torque component corresponding to friction on the feed shaft from the torque of the feed shaft.

* * * * *